United States Patent

Svoboda

[15] 3,636,334

[45] Jan. 18, 1972

[54] PARALLEL ADDER WITH DISTRIBUTED CONTROL TO ADD A PLURALITY OF BINARY NUMBERS

[72] Inventor: Antonin Svoboda, Santa Monica, Calif.

[73] Assignee: The Regents of the University of California, Berkeley, Calif.

[22] Filed: Jan. 2, 1969

[21] Appl. No.: 788,486

[52] U.S. Cl. ............................................................235/175
[51] Int. Cl. ..........................................................G06f 7/50
[58] Field of Search .................................235/175, 174, 173

[56] References Cited

UNITED STATES PATENTS

| | | | |
|---|---|---|---|
| 3,299,261 | 1/1967 | Steigerwalt, Jr. | 235/175 |
| 3,466,433 | 9/1969 | Duda et al. | 235/175 |
| 3,535,502 | 10/1970 | Clapper | 235/174 |

OTHER PUBLICATIONS

Wallace " A Suggestion For a Fast Multiplier" IEEE Trans. on Electronic Computers Feb. 1964 pp. 14–17
Sroboda, Adder With Distributed Control, " IEEE Trans. on Computers," Vol. C-19, No. 8, Aug. 1970 pp. 749–751

*Primary Examiner*—Malcolm A. Morrison
*Assistant Examiner*—David H. Malzahn
*Attorney*—Lindenberg, Freilich & Wasserman

[57] ABSTRACT

Parallel addition of $2^n-1$ binary numbers is provided by storing the numbers to be added in registers such that bits of the same order are stored in the same register. The number of binary ones in a given register is determined asynchronously by shifting binary ones to one end of the register and detecting the boundary between ones and zeros. A code converter translates the detected number of ones in the given register into a binary-coded group of digital signals, such as a triad of binary-coded signals $2^i\cdot R$, $2^{i+1}\cdot S$ and $2^{i+2}\cdot T$(when $n=3$), where $i$ is the order of the given register. A parallel adder adds the binary-coded signals of equal weight, such as a triadder when $n=3$. To add more numbers, it is simply necessary to expand the parallel adder, such as to a quadriadder when $n=4$. However, to add up to $2^7-1$ numbers, a cascade arrangement is preferred in which registers and networks are expanded in an arrangement strictly analogous with that for generating triads when $n=3$, but with seven-bit code groups as inputs to the arrangement for adding $2^3-1$ numbers. Thus, by adding just one unit to $n$, it is possible to add $2^{n+1}-2^n$ more numbers. The advantage increases with $n$, which can be increased without limit by further cascading.

22 Claims, 4 Drawing Figures

INVENTOR.
ANTONIN SVOBODA
BY Lindenberg & Freilich
ATTORNEYS

INVENTOR.
ANTONIN SVOBODA
BY Lindenberg + Freilich
ATTORNEYS

PATENTED JAN 18 1972 3,636,334

SHEET 3 OF 3

*INVENTOR.*
ANTONIN SVOBODA

*BY* Lindenberg + Freilich

ATTORNEYS

PARALLEL ADDER WITH DISTRIBUTED CONTROL TO ADD A PLURALITY OF BINARY NUMBERS

BACKGROUND OF THE INVENTION

The invention described herein was made in the course of a contract with the Office of Naval Research.

This invention relates to a binary adder, and more particularly to method and apparatus for adding a plurality of numbers in parallel.

In the development of digital computers, there has been a continual search for ways of processing data faster. One area of concern has been the time required for arithmetic operations, primarily because of carry propagation delays. This concern has persisted even though solid-state electronics has increased the operating speeds of digital circuits. For the usual binary number of 20 to 40 digits, the carry propagation delay is a very significant factor in the speed with which data may be processed.

To obviate the carry propagation delay, it is possible to provide for each order a carry network that is a function of all lower orders of the augend and addend. In that manner, all carries are generated simultaneously, but at the expense of more gates since the Boolean logic expression expands for each successively higher order to include all of the terms for the generation of lower order carries. Thus, the Boolean logic equation for the most significant order written in the simplest miniterm form would require several million diodes to mechanize.

As a compromise between speed and cost, A. Weinberger, et al., have suggested in National Bureau of Standards Circular No. 591, Section 1 (Feb. 14, 1958), that carries be generated in parallel by groups, and propagated between groups such that a carry $C_4$ for the fourth order be generated simultaneously with carries $C_1$ to $C_3$ of lower orders as a function of all lower order digits of the augend and addend. The carry $C_4$ is then used as an auxiliary function to generate simultaneously the carries $C_5$ to $C_8$ during the following time period. The next group of carries $C_9$ to $C_{12}$ is formed as a function of the carry $C_8$ during a subsequent time period.

Another approach to the problem of speeding up arithmetic operations, without unduly increasing the cost of implementation, is based on the fact that in practice most arithmetic operations involve adding more than two numbers. The delay in propagating carries can be avoided by not assimilating carries until the last number has been added. The unassimilated-carry approach may be used to advantage for not only multiplication but also adding a long column of numbers. However, since each number must be added in a separate operation, all that is saved over the more conventional parallel operation is the carry propagation time otherwise required as each number is added. It would be more advantageous to be able to add all numbers together simultaneously with only one set of carries to be generated so that, upon assimilation, the carry propagation time will be no greater than for the addition of two numbers, regardless of how many numbers are being added.

SUMMARY OF THE INVENTION

According to the broadest aspects of the present invention, a memory stores all binary digits of a plurality (M) of numbers to be added, and a plurality (N) of independent networks (one for each binary order of numbers to be added) bind digits of the numbers of the same order in such a manner that once the additive components (binary digits in their respective orders) have been stored, an operation is carried out for determining the sum of binary ones present in each order, the maximum being, of course, M binary ones in a given order. Each logic network provides a binary-coded group of $n$ binary digits representing that sum where $2^n—1$ is equal to M.

The least significant digit of a given code group is assigned the weight $2^i$ of the order $i$ of additive components of which it represents the sum, where $i$ is equal to 0, 1, 2, 3, . . . N–1. The digits of successively higher orders of that given code group are then weighted $2^{i+1}$, $2^{i+2}$ . . . $2^{i+(n-1)}$. Thereafter, to obtain the sum of the M numbers, digits of equal weight from the logic networks are added together in a parallel adder.

In an illustrative embodiment of the invention, M is equal to seven so that each coded group consists of three binary digits $R_i$, $S_i$ and $T_i$ having weights of $2^i$, $2^{i+1}$ and $2^{i+2}$. Binary digits of equal weight may then be added using conventional binary full adders in accordance with the following exemplary equations:

$$P_i=(R+S+T)\,(\overline{RS+RT+ST})+RST \qquad (1)$$

$$q_{i+1}=RS+RT+ST \qquad (2)$$

where the triadic signals $R$, $S$ and $T$ are selected to have proper and equal weight for the order $i$. End-around carry may be provided by selecting for the adder of the least significant order the following triad:

$$R=R_o$$

$$S=S_{N-1}$$

$$T=T_{N-2}$$

The respective output signals $p_i$ for the various orders ($i$=0, 1, 2, . . . N–1) may be referred to as pseudosum digits since the true sum digits $P_i$ are not provided until the carry digits $q_i$ have been assimilated. A second binary adder is provided for each order to combine the pseudosum and carry digits in accordance with the following exemplary equations:

$$P_i=p_i+q_i+Q_i\,(\overline{p_iq_i+P_iQ_i+q_iQ_i})+p_iq_iQ_i \qquad (3)$$

$$Q_{i+1}=p_iq_i+p_iQ_i+q_iQ$$

With end-around carry, the inputs to the adder for the least significant order are $p_o$, $q_N$ and $Q_N$. In that manner, binary numbers may be subtracted, instead of added, by adding the ones complement of the binary number to be subtracted.

In accordance with an important feature of the present invention, the method for determining how many binary ones are present in a given order of the binary numbers to be added comprises the steps of so rearranging the binary ones of that order as to group them together at one end of a plurality of memory elements and then detecting the boundary between a memory element storing a binary 1 and a memory element storing a binary 0. The binary coded group TSR defining the sum of binary ones grouped together is generated directly by the boundary detector through a code converter.

In order to be able to employ conventional three-input adders to develop the sum of M numbers being added in accordance with equations (1) and (2), it is necessary to limit the number M to a maximum of seven. To add more than seven numbers simultaneously, it is simply necessary to expand the triadder, such as to a quadriadder to add up to 15 numbers, to a pentadder to add up to 31 numbers, and so forth. However, although quadriadders or pentadders may be readily provided without too many additional logic gates, hexadders and heptadders may become too complex for it to be advantageous to continue to expand the capacity for adding numbers in that manner even though by adding just one unit to $n$, where $n$ is the number of input terminals to the parallel adder, $2^{n+1}—2^n$ more numbers can be added. Thus, expansion in that manner becomes more advantageous as $n$ increases, but a point may be reached where further increase of $n$ will result in too much complexity in the parallel adder. When that point is reached, or before, it is preferred to revert to a triadder or quadriadder and expand the system for adding more numbers by cascading a second plurality of N independent networks and associated memory elements in an expanded form strictly analogous to the first plurality of networks. For example, using a triadder, two banks of networks are cascaded such that the binary code group produced to represent the sum of binary ones grouped together in a given order $i$ of an expanded network in the first bank may have as many as seven output terminals connected to input terminals of a limited network of the same order in the second bank. In that manner, $2^7—1$ numbers may be added simultaneously with a triadder having only one time delay for propagating carries. The time required to determine how many binary ones are to be added in a given order in the first bank, and to make the corresponding determination in the second bank must also be considered. That time may be less than 90 nanoseconds in the second bank having $2^3$—1 input terminals for each network (depending upon the circuit components selected) and proportionately greater in the first bank having $2^7$—1 input terminals for each network, but still less than a typical carry propagation delay of about 1,800 nanoseconds for a 20-bit parallel adder.

To add more than $2^7$—1 numbers, the total system may be further expanded by either expanding the parallel adder and the cascaded networks or cascading yet another network having a 127-bit output. As many as $2^{127}$—1 numbers may then be added simultaneously with a triadder having only one carry propagation delay of less than 90 nanoseconds.

Another important feature of the present invention is that the rearranging of the binary digits in a given network is carried out asynchronously by mutually independent control elements as soon as a control signal has completed entering the numbers to be added into the associated memory. If the memory elements of a given order are designated $b_1, b_2, \ldots b_k \ldots b_M$, the binary ones are grouped together in elements $b_1, b_2, \ldots b_k$, where $k$ is the number of binary ones by a control element between each pair of adjacent binary memory elements in accordance with the following equation:

$$b_i^* = \bar{b}_i \cdot b_{i+1} \qquad (5)$$

where $b_i^*$ represents the future state of the $i$-th memory element. Since this action is taking place between all adjacent memory elements asynchronously through mutually independent control elements, the memory elements of a given order will be unstable until finally all the binary ones are grouped together and the future state $b_k^*$ of a given element becomes a steady state $b_k$. That steady state implies the number $k$.

The number $k$ is then detected and encoded in accordance with the following table:

| Logic | T | S | R |
|---|---|---|---|
| $\bar{b}_1=1$ | 0 | 0 | 0 |
| $b_1 \cdot \bar{b}_2=1$ | 0 | 0 | 1 |
| $b_2 \cdot \bar{b}_3=1$ | 0 | 1 | 0 |
| $b_3 \cdot \bar{b}_4=1$ | 0 | 1 | 1 |
| $b_4 \cdot \bar{b}_5=1$ | 1 | 0 | 0 |
| $b_5 \cdot \bar{b}_6=1$ | 1 | 0 | 1 |
| $b_6 \cdot \bar{b}_7=1$ | 1 | 1 | 0 |

Only one of the foregoing logic equations may be true at any given time. If none of the foregoing are true, $k$ equal to M is implied when M is equal to 7 for the triadic signal group TSR. The foregoing table may obviously be expanded for M greater than 7. For example, in an expanded system of two cascaded banks of networks where M equal to 127, seven encoding gates provide a seven-bit code output from an expanded network in the first bank. That seven-bit code is transmitted to a network in the second bank which then produces the triad (T, S and R) for a given order of numbers to be added.

The novel features that are considered characteristic of this invention are set forth with particularity in the appended claims. The invention will best be understood from the following description when read in connection with the accompanying drawings.

DETAILED DESCRIPTION OF THE PREFERRED EMBODIMENTS

Figure 1:
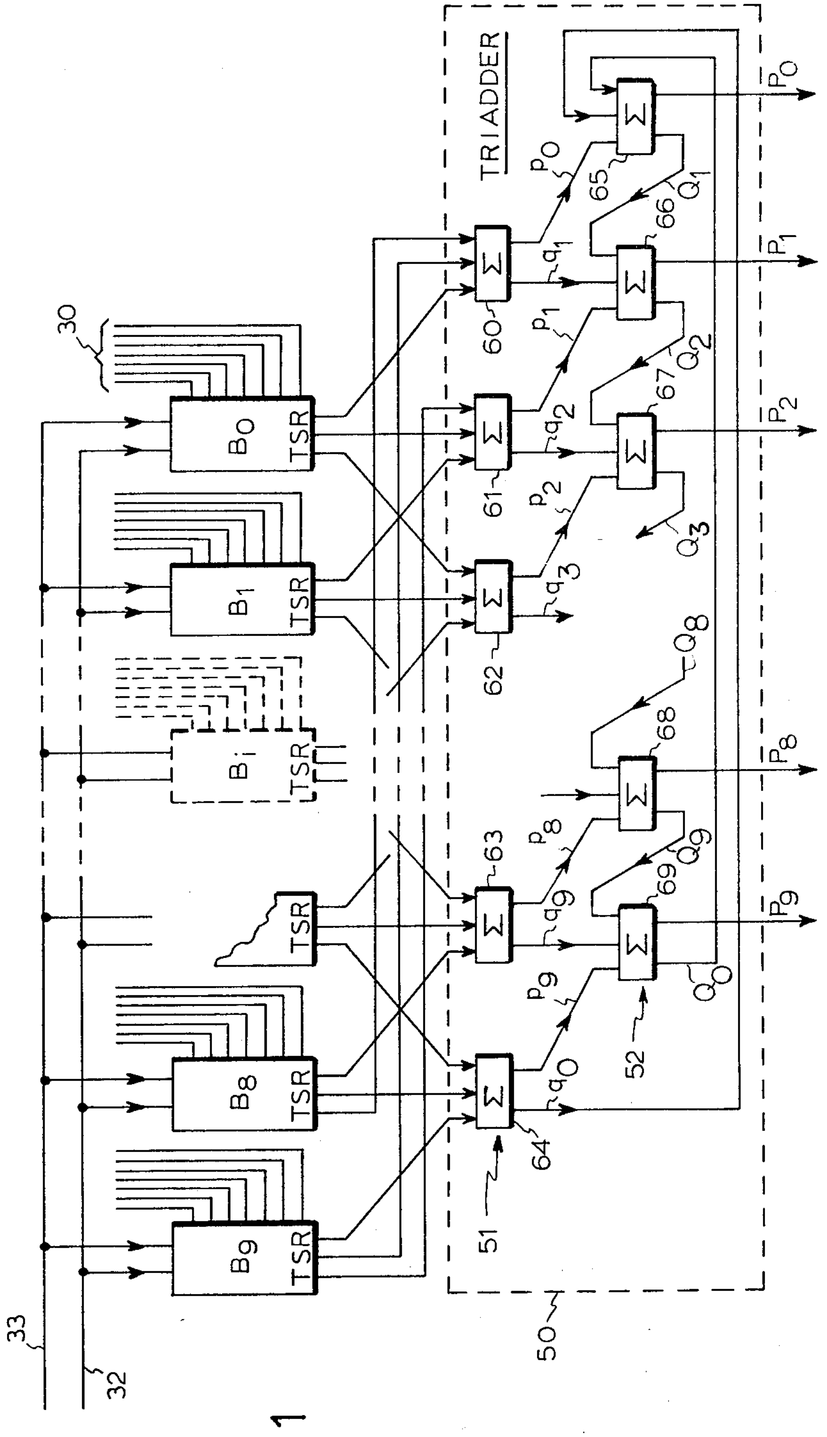
FIG. 1 is a schematic block diagram of a preferred embodiment of the invention employing a plurality of independent B-networks and a parallel triadder.

Referring now to the schematic block diagram of FIG. 1, which shows an arrangement for simultaneously adding $2^n$—1 binary numbers (where $n$=3), a plurality of independent B-networks ($B_0$ to $B_9$) are provided, one for each order $i$ from 0 to 9 of the binary numbers to be added. Each B-network is preferably implemented in accordance with the logic diagram of FIG. 2 which includes a register 10 of seven SR flip-flops 11 to 17. Each flip-flop comprises a pair of NOR gates, such as NOR-gates 18 and 19 of flip-flop 11. The true side of each flip-flop is indicated by a numeral "1" in the lower gate. Accordingly, the true output terminals $b_2$ to $b_7$ and the false output terminals $\bar{b}_1$ to $\bar{b}_6$ of flip-flops 12 and 17 are connected to the respective NOR-gates 21 to 26.

The register 10 is filled by binary digits of the same binary order $i$ of the binary numbers being added. The binary numbers may be represented in accordance with the following equation:

$$B^j = B_{N-1}^j 2^{N-1} + \ldots B_i^j 2^i + \ldots B_1^j 2^1 + B_0^j$$

where $j$ is a number from 1 to 7 and $N$ is the number of independent B-networks, one for each order $i$ of the numbers being added. Thus, to store seven numbers $B^1$ to $B^7$, the network $B_i$ is provided with seven flip-flops to receive the additive elements $b_i^j$ of the same binary order $i$. Accordingly, as viewed in FIG. 1 the memory elements $b_i^j$ belonging to the same binary order $i$ are in the same column in a given B-network, and the memory elements which store digits of the same one of the numbers $B^j$ are in the same row, one binary memory element in each B-network.

Figure 2:
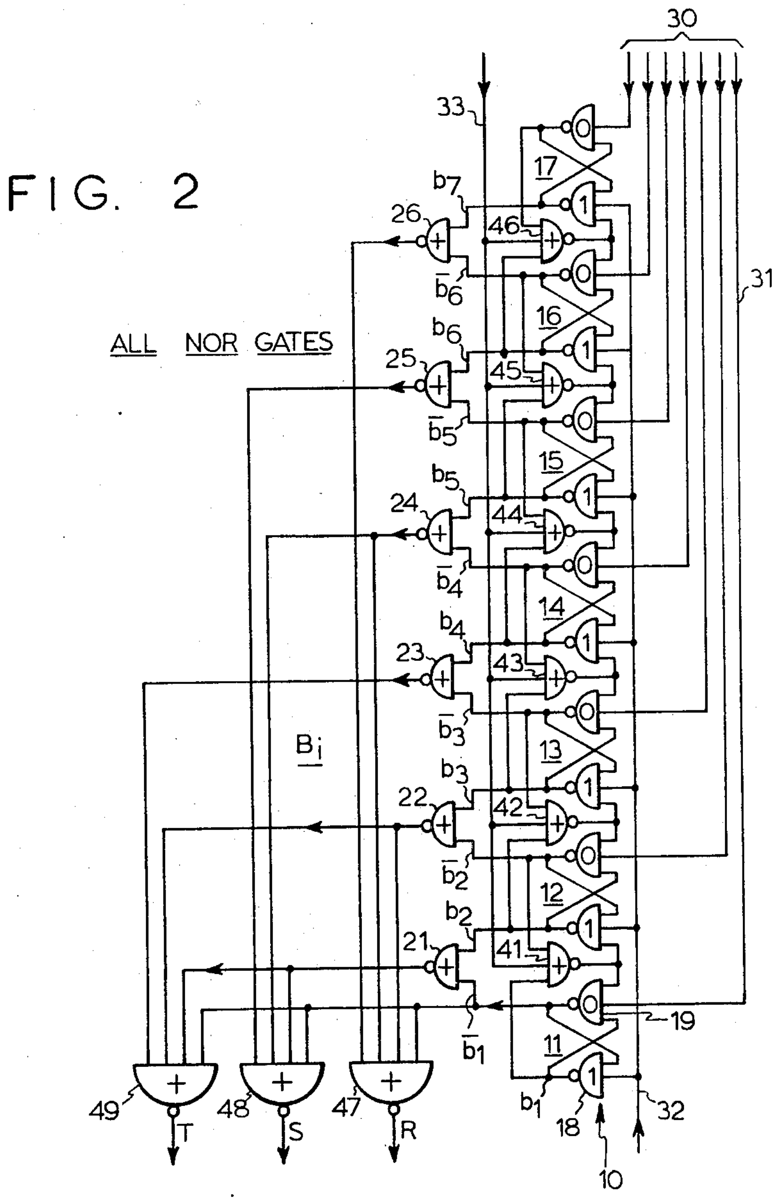
FIG. 2 is a logic diagram of an exemplary B-network for a given order $i$ the embodiment of FIG. 1.

Before numbers are entered into the B-networks through cables, such as a cable 30 of seven wires connected to network $B_0$ (each cable having a wire connected to the true side of a flip-flop, such as conductive wire 31 connected to the NOR-gate 19 in FIG. 2), all registers of the B-networks are reset by a binary-1 level pulse on a line 32 (FIG. 1) connected to the true side of each flip-flop as shown in FIG. 2. The numbers are then entered asynchronously through the cables connected to the false side of the flip-flops. Thus, a binary one entered at NOR-gate 19 via line 31 will provide a complimentary signal (binary-0) at the output terminal $\bar{b}_1$. While numbers are being entered, a binary-1 level signal is applied over line 33 as a control to inactivate NOR-gates 41 to 46 of each B-network as shown in FIG. 2.

Once the numbers $B^j$ have been entered, the control signal on the line 33 is removed, i.e., the signal on the line 33 is returned to a binary-0 level. The NOR-gates 41 to 46 then become active to group together all binary ones at one end of the register 10 of the respective B-networks, and all binary zeros at the other end. When this asynchronous process stops, the lower part of the registers will be filled with ones (i.e., each of $b_1, b_2 \ldots b_k$ will be one) and the upper part will be filled with zeros (i.e., each of $b_{k+1}, b_{k+2} \ldots b_7$ will be zero).

If there are no binary ones in the register 10 of a given order, the output $b_1$ of the lowest flip-flop 11 will be true, and R, S and T outputs of NOR-gates 47, 48 and 49 will be false. At the other extreme, if the register 10 is completely full of binary ones, then all output terminals of all NOR-gates 21 to 26 will be false. Since the complimentary output $\bar{b}_1$ of the flip-flop 11 will also be false, all output terminals R, S and T of the B-network will be true. Thus, the condition of all ones in the register is implied, while all other conditions are expressly set forth by true signals.

When the register 10 of a given B-network is partially filled with ones, then there is boundary between grouped ones and zeros defined by:

$$b_k = 1, \quad b_{k+1} = 0$$

Then all NOR-gates 21 to 26 will be off except the one boundary level detecting NOR gate for $k$ binary ones in the register 10.

Each of the NOR-gates 21 to 26 is connected to various ones of the NOR-gates 47 to 49 such as to effectively convert the decimal number $k$ (equal to a number from 1 to 7) to a binary code in accordance with the equation:

$k=2^2T+2^1S+R$ where $T$, $S$ and $R$ are binary digits (0 or 1). Thus, each B-network receives binary digits of a given order $i$ from the respective numbers $B^j$, rearranges the binary digits to group the binary ones at the lower end of the register 10 as viewed in FIG. 2, and converts the number $k$ of binary ones into a triad of signals $R$, $S$ and $T$ in a binary code. Simultaneous addition of the numbers $B^j$ is then completed by a triadder 50 comprising two groups of full binary adders 51 and 52, shown in FIG. 1, in accordance with equations (1) to (4) set forth hereinbefore.

The operation of the NOR-gates 41 to 46 facilitates the NOR-gates 21 to 26 determining the number of binary ones in a given order of numbers $B^j$ to be added. That operation respects the basic law of addition in any polyadic numerical system which is that the sum of any column of numbers remains unchanged if the digits belonging to the same polyadic order are rearranged in any arbitrary sequence.

The simplest configuration is selected for the control elements (NOR-gates 41 to 46) to group the binary ones in accordance with equation (5). The control gate for a given level $k$ between two flip-flops functions only when the flip-flop above it is storing a bit 1 and the flip-flop below it a bit 0. Then the control gate transfers asynchronously the bit 1 from the upper flip-flop to the lower one, and resets the upper flip-flop. If the flip-flop receiving a bit 1 in response to a control gate is above a flip-flop storing a bit 0, then a control gate between them will function to transfer the bit 1 into the lower flip-flop. This is so because the control gate, such as NOR-gate 42 has one terminal connected to the false output terminal of the upper flip-flop, and another output terminal connected to the true output terminal of the lower flip-flop. The third terminal connected to the line 33 is held at the binary-0 level during this operation so that all input terminals of the control gate will then be at the binary-0 level, driving the output terminal thereof to the binary-1 level to set the lower flip-flop and reset the upper flip-flop.

The B-networks are unstable due to operation of control elements thereof (NOR-gates 41 to 46) as long as a flip-flop storing a bit 1 has below it a flip-flop storing a bit 0. When all of the binary ones have been shifted down, the network becomes stable and the output terminals $R$, $S$, $T$ provide signals which may be added to yield the sum (modulo 1023) at output terminals $P_0$ to $P_9$ of the adder as follows:

$$\text{SUM}=P_9 2^9+P_8 2^8+\ldots P_2 2^2+P_1 2^1+P_0$$

This is so because the boundary between ones and zeros in a given network $B_i$ establishes or defines uniquely the count of binary ones (i.e., the sum of binary digits) in the order $i$. The triads of outputs ($T_0$, $S_0$, $R_0$), ($T_1$, $S_1$, $R_1$), ... ($T_9$, $S_9$, $R_9$) are added according to the following scheme (which includes end-around carry), where the subscripts identify the triads with the B-networks.

| | | | | |
|---|---|---|---|---|
| $T_7$ ---------------- | $T_1$ | $T_0$ | $T_9$ | $T_8$ |
| $S_8$ ---------------- | $S_2$ | $S_1$ | $S_0$ | $S_9$ |
| $R_9$ ---------------- | $R_3$ | $R_2$ | $R_1$ | $R_0$ |
| $P_9$ ---------------- | $P_3$ | $P_2$ | $P_1$ | $P_0$ |

It should be appreciated that the number of orders being added has been limited to ten to simplify explanation and illustration. In practice the number of orders would be 20 to 40, or more. The present invention has no limit in that regard.

The time at which the B-networks all become stable, so that the sum may be formed by the triadder 50, will depend upon the arrangement of binary numbers being added. It may sometimes be desirable to provide means for detecting when a stable condition has actually been reached, rather than allow the maximum time required to elapse, particularly in an expanded system illustrated in FIG. 4.

The time required to add the triads will, of course, depend upon the number of orders in the numbers to be added since finally it becomes necessary to generate and propagate carries. However, the delay due to propagation of carries occurs only once for the addition of all numbers. For a 10-bit adder, the propagation delay is less than 1,800 nanoseconds. With the preliminary time required for rearranging the digits of less than 90 nanoseconds, depending upon the circuit configurations employed, the total time will be less than 1,890 nanoseconds. Integrated circuits will significantly reduce that time.

There is perhaps no significant time advantage in adding fewer than four numbers, but for four or more numbers, the advantage is clear since each number added more in excess of four does not require any more time for propagation of carries than to add two numbers, and by cascading, as will be described with reference to FIG. 4, up to $2^7-1$ (or 127) can be added simultaneously. By further cascading with one more level of independent networks in a geometric manner, up to $2^{127}-1$ numbers can be added simultaneously. The time required to rearrange digits will increase in direct proportion to the length of the column of figures being added, but the carry propagation time will remain the same as for adding two numbers.

The full adders in the two groups 51 and 52 (represented in FIG. 1 by blocks with the legend $\Sigma$) are each implemented according to the equations (1) to (4) as noted hereinbefore. Thus, the triadic signals $R$, $S$ and $T$ transmitted into an adder for a given order $i$ have the same weight $2^i$. For instance, the triad $T_0$, $S_1$, $R_2$ transmitted into a full adder 62 have the same weight $2^2$. It should be noted, however, that since the weigh of $R_9$ is $2^9$, the weights of $S_9$ and $T_9$ are ostensibly $2^{10}$ and $2^{11}$, respectively. But since addition is modulo 1023, the signals $S_9$ and $T_9$ are connected to full adders 60 and 61, respectively, and therefore are assigned the respective weights $2^0$ and $2^1$.

Figure 3:
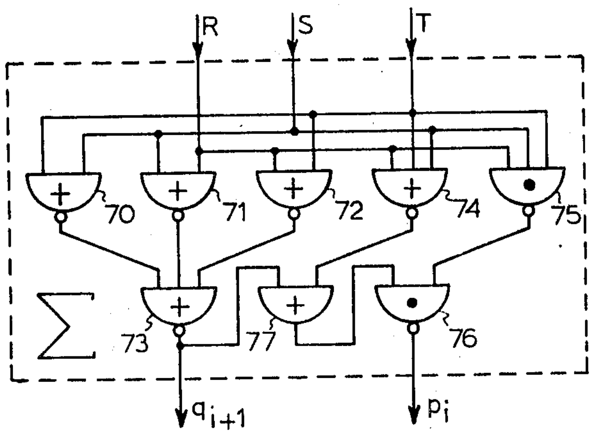
FIG. 3 is a logic diagram of an exemplary binary full adder Σ employed in the triadder of FIG. 1.

FIG. 3 shows an example of a full adder implemented in accordance with the equations (1) and (2) using NOR-gates 70 to 73 to develop the carry signal $q_{i+1}$. The sum signal $p_i$ is developed by a NOR-gate 74, NAND-gates 75 and 76, and an OR-gate 77.

The configuration and operation of the exemplary full adder of FIG. 3 is well known to those skilled in the art and presented herein only for the purpose of illustrating a preferred way of implementing the triadder 50 of FIG. 1 with two groups 51 and 52 of identical adders. The first group develops what may be referred to as psuedosums $P_i$ since the true sum $P_i$ of the numbers being added is not known until carries $q_i$ have been assimilated in the second group 52 in accordance with equations (3) and (4).

To provide end-around carry within the triadder 50, adder 65 for the least significant digit position of the second group 50 is connected to the carry $q_o$ from adder 69 in the most significant digit position of the first group 51 of adders and the carry $Q_o$ from adder 69 in the most significant digit position of the second group of adders 52. To complete the end-around carry for the system, the most significant signals $S$ and $T$ of the triad from the network $B_9$ are connected to the adders 60 and 61, respectively, of the first group of adders 51.

Figure 4:
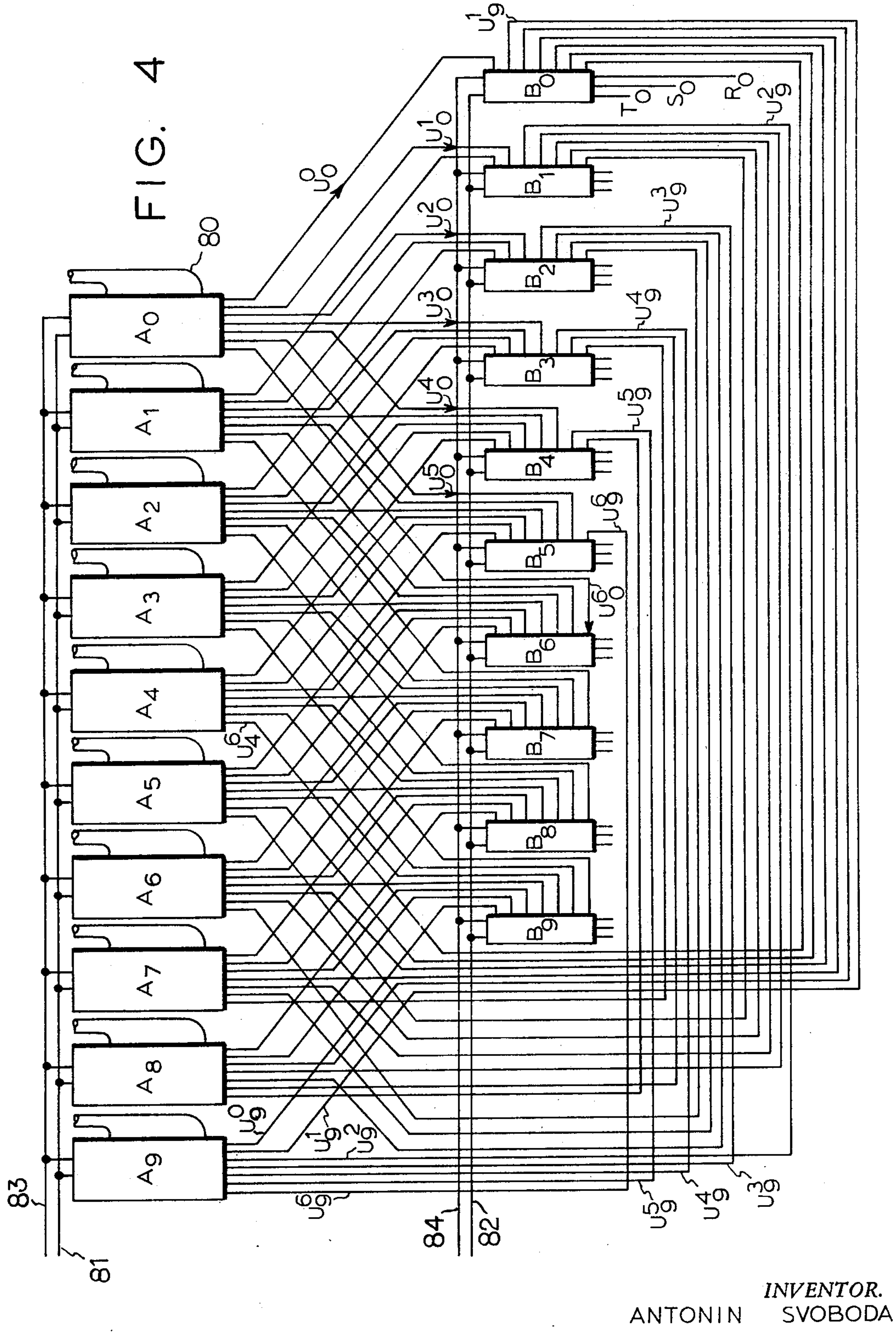
FIG. 4 illustrates in a schematic block diagram form a cascade arrangement of independent networks A and B for simultaneously adding a greater number of binary numbers in parallel.

Referring now to FIG. 4, an expanded system is disclosed comprising a plurality of A-networks represented by blocks $A_o$ to $A_9$. Each A-network is provided in an arrangement strictly analogous with the B-networks. Thus, each includes a register of 127 S–R flip-flops, control elements comprising 126 NOR-gates between flip-flops to carry out the operation of grouping all binary ones at the lower end of the register, and boundary detectors comprising 126 NOR-gates having their output terminals connected to seven output gates to provide at seven output terminals a parallel output codes $U_i^6$ ... $U_i^2$ $U_i^1$ $U_i^0$ representing the sum of binary ones grouped together in the register, where $i$ corresponds to the subscript of the letter A identifying the network (i.e., corresponds to the binary order of the bits stored in the network). A cable having 127 wires (one for each binary number to be entered for addition) is connected to each A-network, such as a cable 80 connected to the network $A_o$, with each wire thereof connected to a different flip-flop. The other end of each wire is connected to a source of the least significant binary digit of a different one of the 127 numbers to be added. Sources of other successively higher digits are similarly connected to the networks $A_1$ to $A_9$.

The binary digits of the code $U_i^6 \ldots U_1^2 U_i^1 U_i^0$ are weighted such that the most significant digit $U_i^6$ has the weight $2^i \cdot 2^6$ and the least significant has the weight $2^i \cdot 2^0$. Since a given B-network must receive binary digits of equal weight, a given output signal $U_i^j$ having a weight $2^i \cdot 2^j$ is connected to an input terminal of the network $B_i$, where is a number from 0 to 9. End-around carry is provided by connecting the outputs of the network $A_9$ modulo 1023. For instance, the output $U_4^6$ of the network $A_4$ has the weight $2^4 \cdot 2^6 = 2^{10} = 2$(modulo 1023); therefore, it has to go into the network $B_0$ which stores binary digits having the weight $2^0$. The output $U_9^1$ must go into the network $B_0$ also for a similar reason. Thus, by adding the exponent $j$ of a given output signal $U_i^j$ to the subscript $i$ and subtracting 10, if that sum is equal to or greater than 10, a number is obtained which correctly identifies the subscript of the B-network into which it must go.

The operation of the A-networks is the same as the B-networks, but must precede the operation of the B-networks, and will require approximately 18 times as long to group the binary ones in the respective registers. The functional steps for operation of the arrangement illustrated in FIG. 4 are as follows:

1. Reset register in networks $A_0$ to $A_9$ via a line 81 connected to flip-flops thereof in the same manner that the line 32 is connected to flip-flops of the register 10 in the B-network shown in FIG. 2. Also reset the networks $B_0$ to $B_9$ via line 82 in the same manner.

2. Read in 127 binary numbers into the registers of the networks $A_0$ to $A_9$ under control of a true signal on line 83 connected to control elements thereof in the same manner that the line 33 is connected to control elements 41 to 46 of the B-network shown in FIG. 2. When the operation of rearranging digits has been completed, the control signal is returned to the false level (binary-0 level). Coded output signal $U_i^j$ are transmitted to the B-networks when the control signal on the line 83 is returned to the false level.

2. Read in the coded signals $U_i^j$ to the networks $B_0$ to $B_9$ under control of a true (binary-1 level) signal on the line 84 connected to control elements thereof as described with reference to control elements 41 to 46 of FIG. 2. Triadic output signals $T_i$, $S_i$ and $R_i$ are transmitted to a double bank of full adders from the B-networks when the control signal on the line 83 is returned to the false level as described with reference to FIG. 1.

The sum is then read out from the output terminals $P_0$ to $P_9$ as described with reference to FIG. 1. If addition of more than 127 numbers is desired, it is possible to cascade yet another group of networks ahead of the A-networks, each having an input cable with $2^{127}-1$ wires for addition of $2^{127}-1$ numbers, and 127 output terminals for connection to respective A-networks in a manner strictly analogous to the way seven output terminals of the given A-network are connected to a B-network.

It is doubtful that it would ever be desirable to provide such a large adder, except possibly for multiplication, but with the development of the integrated circuit technology, that would be feasible because each network is the same as all other networks of the same group, such as the group of B-networks. Accordingly, once the initial work has been done to fabricate one network, other networks can be produced at no greater unit cost than for other integrated circuits. Whether a given network may be all contained on one integral substrate will depend not upon the technology of producing integrated circuits, but upon physical limitation of providing input and output terminals.

Although NOR gates have been shown in the preferred embodiments of the invention, it should be understood that NAND gates, or any system of Boolean logic gates, could be used to equal advantage. Accordingly, inasmuch as it is recognized that modifications and variations falling within the spirit of the invention will occur to those skilled in the art, it is not intended that the scope of the invention be determined by the disclosed exemplary embodiments, but rather by the breadth of the appended claims.

I claim:

1. A method for adding a maximum of M binary numbers, each number having N binary digits, by utilizing a memory of binary elements $b_1, b_2, \ldots b_M$ for storing all MN binary digits in a first plurality of N independent networks, one for each order of said binary numbers for binding binary digits of the same order in such a manner that, once said binary numbers have been stored in said elements, the sum of all numbers may be provided simultaneously, comprising the steps of reordering the binary ones of a given order at one end of a column of binary elements, in each column detecting the boundary level between a binary one in element $b_k$ and a binary zero in element $b_{k+1}$, where $k$ is the number of binary ones stored in said column of said given order, to determine how many binary ones of the same order are stored, transmitting from each network a binary-coded group of $n$ binary digits representing the number $k$ of binary ones stored in the respective columns of binary elements, where $2^n - 1$ is equal to M, and where the least significant digit of a coded group from a given network for the order $i$ of said numbers to be added is assigned the weight $2^i$, and $i$ is an integer from 0 for the least significant order of said numbers to be added to N−1 for the most significant order of said numbers to be added, and other digits of successively higher orders of said coded group are weighted $2^{i+1}, 2^{i+2}, \ldots 2^{i+(n-1)}$), and adding binary digits of equal weight from said groups.

2. A method as defined in claim 1 wherein said binary ones are grouped together asynchronously in said binary memory elements of said column for said given order in accordance with the following equation:

$$b_i^* = \bar{b}_i \cdot b_{i+1}$$

where $b_i^*$ represents the future state of the $i$-th memory element of said column and $i$ is one of a series of integers $1, 2, \ldots k \ldots$ M.

3. A method as defined in claim 2 wherein said number $k$ is detected in accordance with the following equations:

$$\bar{b}_1 = [0]\underline{1}$$

$$b_1 \cdot \bar{b}_2 = 1$$

$$\ldots$$

$$b_k \cdot \bar{b}_k + 1 = [k]\underline{1}$$

$$\ldots$$

$$b_{M-1} \cdot \bar{b}_M = [M-1]\underline{1}$$

$$b_M = [M]\underline{1}$$

where only one equation may be true at any given time and the last equation may be implied by all prior equations being false, and the one equation which is true is indicative of the number of binary ones of said column for said order.

4. A method as defined in claim 1 wherein said last step of adding binary digits of equal weight from said groups is carried out in a manner strictly analogous to steps defined in claim 1 utilizing a second plurality of networks cascaded with said first plurality of networks such that the binary digits of numbers to be added by each of said first plurality of networks are digits of binary-coded groups produced by said second plurality of networks, whereby $2^M - 1$ numbers stored in memory elements of said first plurality of networks may be added in parallel.

5. A method as defined in claim 1 wherein M is equal to 7, whereby each of said first plurality of networks provides a binary-coded group of three binary digits $R$, $S$ and $T$ weighted $2^i$, $2^{i+1}$ and $2^{i+2}$, respectively, and wherein binary digits $R$, $S$ and $T$ of equal weight from said groups are combined in a full adder to provide a pseudosum digit $p_i$ for a given order when any one, but not two, or all three binary digits are equal to one and an assimilated carry digit $q_i{}^+{}_1$ when any two binary digits are equal to one. 7, 6. A method as defined in claim 5 wherein said last step said sum and carry digits $p_i$ and $q_i$ of a given order $i$ are combined to provide a sum digit $p_i$ and a carry digit $Q_i{}^+{}_1$ in response to said digits $p_i$ and $q_i$ and a carry $Q_i$ from the order $i$-1.

7. A method as defined in claim 6 wherein $p_i$ and $q_i$ signals are combined in a full parallel binary adder to provide a sum in the form $P_{N-1}\,2^{N+1}+\ldots P_2\cdot 2^2+P_1\cdot 2^1+P_0$ by generating the binary digits signals $P_i$ in accordance with the following equation:

$$P_i=(p_i+q_i+Q_i)(\overline{p_iq_i+p_iQ_i+q_iQ_i})+p_iq_iQ_i$$
$$Q_{i+1}=p_iq_i+p_iQ_i+q_iQ_i$$

8. A method as defined in claim 7 wherein said full parallel binary adder end-around carry is provided by selecting for the pseudosum full adder of the least significant order, the triadic signals *R*, *S* and *T* from the least significant order, most significant order, and next to most significant order, respectively.

9. A method as defined in claim 6 wherein end-around carry is provided by selecting for the psuedosum full adder of the least significant order of the triadic signals *R*, *S* and *T* from said networks of least significant order, most significant order, and next to most significant order, respectively, and for the sum full adder of the lest significant order the inputs $P_o$, $q_{N-1}$, and $Q_{N-1}$ where the subscript N-1 is equal to the integer *i* which defines the weight $2^i$ for the most significant order of numbers to be added.

10. Apparatus for simultaneously adding a number M of binary numbers having N digits of weights $2^0, 2^1, 2^2 \ldots 2^{N-1}$ in successively increasing orders 1, 2, 3 . . . N, comprising:

a first plurality of registers, one for each order of said binary numbers, a given register having a plurality of binary memory elements $b_1$ to $b_M$, each memory element being adapted to store a digit of a different binary number, but of the same binary order as other memory elements of the same register;

a first means connected to each of said first plurality of registers for independently reordering the binary ones of a given order at one end of a column of binary memory elements, in each column detecting the boundary level between a binary one and a binary zero after the reordering to determine the number of binary ones stored in its associated register and, in response thereof, generating a binary-coded group of *n* signals representative of the number of binary ones stored, each signal having a weight equal to the product $2^i\cdot 2^j$, where *i* is one of a series of N integers 0, 1, 2 . . . N–1 corresponding to one of said orders 1, 2, 3 . . . N and *j* is an integer from 0 to *n*–1 corresponding to the orders from 1 to *n* of said binary-coded group of*n* signals; and means connected to all of said first means for adding in parallel signals of binary-coded groups generated by all of said first means, said parallel adding means being connected for signals of equal weight to be added together to provide the sum of said binary numbers being added together.

11. Apparatus as defined in claim 10 wherein said binary ones are grouped together in a given register in memory elements $b_1$ to $b_k$, where *k* is the number of binary ones in said given register, by means for shifting binary ones toward said memory element $b_1$ in accordance with the following control function:

$b_i^*=\bar{b}_ib_{i+1}$ where $b_i^*$ represents the future state of the *i*-th memory element and *i* is one of a series of integers 1, 2, . . . *k*, . . . M.

12. Apparatus as defined in claim 11 wherein said binary-coded group of *n* signals is generated by means for converting *k* to a binary number of *n* digits.

13. Apparatus as defined in claim 12 wherein *n* is equal to three and said means for adding in parallel signals of said binary-coded groups comprises a first group of binary full adders, a different one being associated with each order of binary numbers to be added, a given binary full adder being connected to receive signals of equal weight commensurate with the order of binary numbers to be added with which it is associated, and transmitting a pseudosum signal and a carry signal.

14. Apparatus as defined in claim 13 wherein said parallel adding means further includes a second group of binary full adders, a different one associated with each full adder of said first group, a given binary full adder of said second group being connected to receive a pseudosum signal from its associated one of said first group of full adders, a carry signal from the full adder of next lower order of said first group and a carry signal from the full adder of next lower order of said second group.

15. Apparatus as defined in claim 10 wherein end-around carry is provided by means for adding binary-coded group signals having weights $2^{N-1}\cdot 2^j$ with binary-coded group signals having weights $2^0\cdot 2^{j-1}$, but only when the sum (N–1)+*j*>N.

16. Apparatus as defined in claim 15 wherein *n* is equal to three and said means for adding in parallel signals of said binary-coded groups comprises a first group of binary full adders, a different one associated with each order of binary numbers to be added, a given binary full adder receiving being connected to receive signals of equal weight commensurate with the order of binary numbers to be added with which it is associated, and transmitting a psuedosum signal and a carry signal.

17. Apparatus as defined in claim 16 wherein a second group of binary full adders is provided, a different one associated with each full adder of said first group, a given binary full adder of said second group being connected to receive a pseudosum signal from its associated one of said first group of full adders, a carry signal from the full adder of next lower order of said first group and a carry signal from the full adder of next lower order of said second group, and end-around carry is provided by adding a carry signal from the full adder of said first group associated with the most significant order of said binary numbers to be added, and a carry signal from the full adder of said second group associated with the most significant order, with a pseudosum signal from the full adder of said first group associated with the least significant order of said binary numbers to be added.

18. Apparatus for simultaneously adding a plurality M of binary numbers having N digits of weights $2^0, 2^1, 2^2 \ldots 2^{N-1}$ in successively increasing orders 1, 2, 3 . . . N, comprising:

a first plurality of registers, one for each order of said binary numbers, a given register having a plurality of memory elements $b_1$ to $b_M$, each memory element being adapted to store a digit of a different binary number but of the same binary order as other memory elements of the same register;

a means associated with and connected to each of said first plurality of registers for independently reordering the binary ones of a given order at one end of a column of binary memory elements, in each column detecting the boundary level between a binary one and a binary zero after the reordering to determine the number of binary ones stored in its associated register, and in response thereto, generating a binary-coded group of *n* signals representative of the number of binary ones stored, each signal having a weight equal to the product $2^i\cdot 2^j$, where *i* is one of a series of N integers 0, 1, 2 . . . N–1 corresponding to an associated one of said orders 1, 2, 3 . . . N, and *j* is an integer from 0 to *n*–1;

a second plurality of registers, one for each of said first plurality of registers, each register having a plurality of memory elements $b_1$ to $b_n$, where *n* is the number of binary digit signals generated by a given one of said first means associated with one of said first plurality of registers, a given one of said second plurality of registers being connected to receive and store in memory elements thereof *n* binary signals generated by one of said first means associated with one of said first plurality of registers associated with said given one of said second plurality of registers; and a second means associated with and connected to each of said second plurality of register for independently reordering the binary ones of a given order at one end of a column of binary memory elements, in each column detecting the boundary level between a binary one and a binary zero after the reordering to determine the number of binary ones stored in its associated register, and in response thereto, generating a binary-coded group of three signals representative of the number of binary ones stored, each signal having a weight equal to the product $2^i \cdot 2^j$, where $i$ is one of a series of N integers 0, 1, 2 . . . N–1 corresponding to an associated one of said orders 1, 2, 3 . . . N and $j$ is an integer from 0 to 2; and third means connected to all of said second means for adding in parallel signals of binary-coded groups generated by all of said different second means, signals of equal weight being added together to provide the sum of said binary numbers being added together.

19. Apparatus as defined in claim 18 wherein said binary ones are grouped together in a given register in memory elements $b_1$ to $b_k$, where $k$ is the number of binary ones in said given register, by shifting binary ones toward said memory element $b_1$ in accordance with the following control function:

$$b_i^* = \bar{b}_i b_{i+1}$$

where $b_i^*$ represents the future state of the $i$-th memory element and $i$ is one of a series of integers 1, 2, . . . $k$ . . . $x$, and $x$ is equal to the number of binary elements in said given register.

20. Apparatus as defined in claim 19 wherein said binary-coded group of $n$ signals generated by said different first means and binary-coded group of three signals generated by said different second means is each generated by different means for converting $k$ to a binary number.

21. In combination a register for storing M binary digits and apparatus for asynchronously grouping all binary ones together in binary memory elements $b_1$, $b_2$, . . . $b_k$ of said register, and all binary zeros in binary memory elements $b_{k+1}$, . . . $b_M$ comprising a plurality of control elements, one between each pair of adjacent binary memory elements, which functions in accordance with the following equation:

$$b_i^* = \bar{b}_i b_{i+1}$$

where $b_i^*$ represents the future state of a $i$-th binary memory element and $i$ is one of a series of integers 1, 2, . . . $k$ . . . M.

22. Apparatus as defined in claim 21 including means for disabling operation of said plurality of control elements while said M binary digits are being entered into said register.

* * * * *